E. A. TOWNE.
CONVEYER.
APPLICATION FILED JAN. 16, 1922.
1,428,721.
Patented Sept. 12, 1922.
2 SHEETS—SHEET 1.
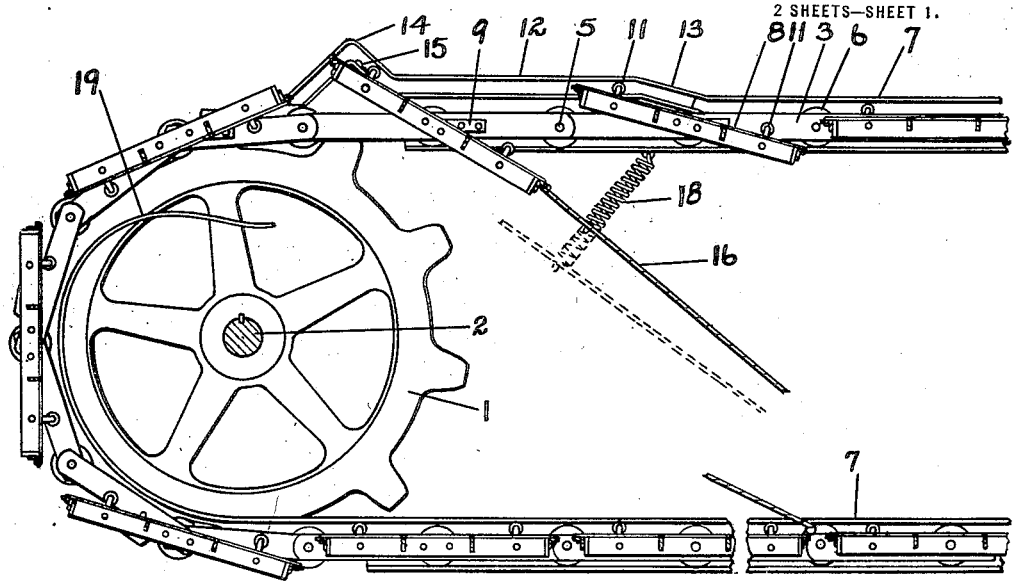
Fig. II.
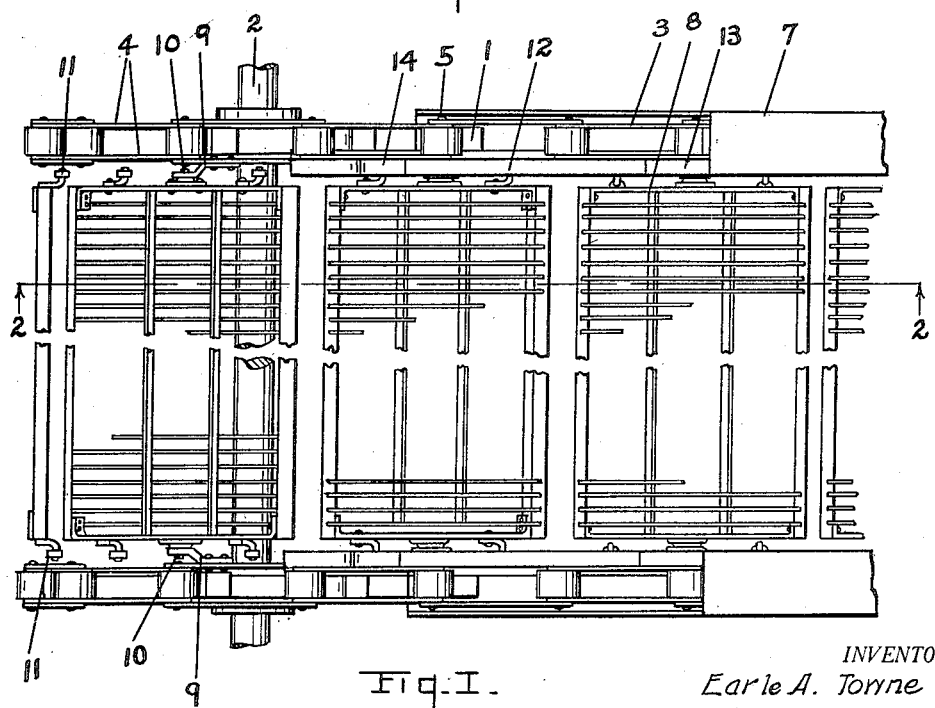
Fig. I.
INVENTOR.
Earle A. Towne
BY
ATTORNEYS.

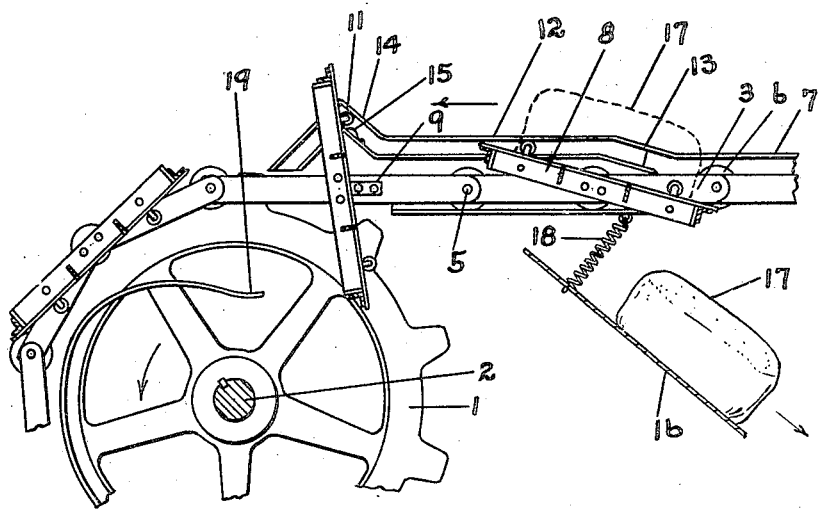

Patented Sept. 12, 1922.

1,428,721

UNITED STATES PATENT OFFICE.

EARLE A. TOWNE, OF ALBION, MICHIGAN, ASSIGNOR TO UNION STEEL PRODUCTS CO., LTD., OF ALBION, MICHIGAN.

CONVEYER.

Application filed January 16, 1922. Serial No. 529,688.

*To all whom it may concern:*

Be it known that I, EARLE A. TOWNE, a citizen of the United States, residing at Albion, county of Calhoun, State of Michigan, have invented certain new and useful Improvements in Conveyers, of which the following is a specification.

This invention relates to improvements in conveyers.

My improved conveyer is especially designed by me for cooling bread and I have illustrated my improvements as I have designed and adapted them for that purpose.

I have not illustrated a complete conveyer but have illustrated such portions thereof as relate to my invention.

The main object of the invention is to provide an improved conveyer for the cooling of bread which maybe of such length as will properly cool the bread, the bread being returned to a point convenient for wrapping or packaging.

Further objects, and objects relating to structural details, will definitely appear from the detailed description to follow.

I accomplish the objects of the invention by the devices and means described in the following specification. The invention is clearly illustrated in the accompanying drawing, forming a part of this application, in which:

Fig. I is a detail plan view of a bread cooler embodying the features of my invention.

Fig. II is a detail vertical section on a line corresponding to line 2—2 of Fig. I.

Fig. III is a detail vertical section corresponding to that of Fig. II further illustrating the movement of the parts.

In the drawing similar reference characters refer to similar parts throughout the several views, and the sectional views are taken looking in the direction of the little arrows at the ends of the section lines.

I have illustrated only the rear or outer end of my improved bread cooler as the means for placing the bread upon the forward end of the structure will be readily understood by those skilled in the art to which my invention relates and form no part of this invention.

The sprockets 1 are mounted upon the shaft 2 in a spaced relation. This shaft 2 may be a driving shaft or an idle shaft, as convenient.

I provide conveyer chains, designated generally by the numeral 3, comprising spaced links 4 connected by pivots 5 having rollers 6 thereon between the links. These rollers travel in conveyer ways 7 disposed to support the reaches of the conveyer chains between the sprockets. The carriers 8, made up of suitable longitudinal and cross bars and are pivotally mounted on brackets 9 mounted on alternate links so that the journals 10 of the carriers are aligned with journals or pivots 5 of alternate links. The carriers could, however, be otherwise positioned relative to the links.

The carriers are provided with guide rollers 11 which coact with the top flanges of the ways 7 to support the carriers in horizontal or load carrying position, the pulleys being arranged on opposite sides of the journals of the carriers.

Towards the rear end of one of the upper carriers is a switch way 12 opening into the conveyer way to receive the forward guide roller 11 of each carrier. This switch way has an inclined portion 13 at its forward end so that the carriers are tilted somewhat to prevent the rear guide rollers from entering the switch way. At its rear end the switch way is provided with an A-shaped portion 14 which abruptly tilts the carriers to discharge the load and for reversing the same, a spring detent 15 being provided to temporarily hold the forward ends of the carriers while their rear ends swing to a forward position, the pull on the carrier after its pivot has moved past the vertical plane of the detent being such as to disengage the roller from the detent.

When the carriers are tilted their rear ends engage the chute or slide 16, which is positioned between the reaches of the conveyer so that its upper end is engaged by the rear end of each succeeding carrier as it is tilted and the load is discharged to the slide and by the slide delivered to the lower reach of the conveyer, a loaf of bread being indicated at 17 in Fig. III. The upper end of the slide or chute is supported by spring 18 so that the slide yields to release the carriers.

An upwardly and forwardly curved guide bar 19 is provided, its upper end being positioned so that the rear ends of the carrier swing over the same as they are reversed and the carriers are guided to the lower conveyer ways.

With the parts thus arranged their operation is positive and the bread is handled so that the loaves are not injured or distorted. The conveyers may be of any desired length and the bread is returned to a position convenient for packaging.

Having thus described my invention, what I claim as new and desire to secure by Letters Patent, is:

1. In a structure of the class described, the combination of sprocket wheels, conveyer chains comprising pivoted links provided with rollers at their pivots, top and bottom conveyer ways for said rollers, carriers journaled on said conveyer chains axially with alternate pivots thereof, guide rollers disposed on said carriers at opposite sides of their pivots to coact with said ways, a carrier discharging and reversing switch way opening into one of the top conveyer ways adjacent the rear end thereof receiving the forward guide roller of each carrier, said switch way having an incline at its forward end tilting the carriers so that the rear guide rollers thereof do not enter the switch way, said switch way having an A-shaped portion at its rear end for discharging and reversing the carriers, a spring detent positioned on the upward reach of said A-shaped portion to temporarily hold the front ends of the carriers while their rear ends are swung forwardly, a slide disposed below the upper reach of the conveyer and discharging to the lower reach thereof, the upper ends of said slide being spring supported and positioned to be engaged by the rear ends of the carriers as they are tilted to discharge the load, and an upwardly curved guide bar positioned so that the rear ends of the carriers swing over the same as they are reversed.

2. In a structure of the class described, the combination of sprocket wheels, conveyer chains comprising pivoted links provided with rollers at their pivots, top and bottom conveyer ways for said rollers, carriers journaled on said conveyer chains axially with alternate pivots thereof, guide rollers disposed on said carriers at opposite sides of their pivots to coact with said ways, a carrier discharging and reversing switch way opening into one of the top conveyer ways adjacent the rear end thereof receiving the forward guide roller of each carrier, said switch way having an incline at its forward end tilting the carriers so that the rear guide rollers thereof do not enter the switch way, said switch way having an A-shaped portion at its rear end for discharging and reversing the carriers, and a slide disposed below the upper reach of the conveyer and discharging to the lower reach thereof, the upper ends of said slide being spring supported and positioned to be engaged by the rear ends of the carriers as they are tilted to discharge the load.

3. In a structure of the class described, the combination of sprocket wheels, conveyer chains comprising pivoted links provided with rollers at their pivots, top and bottom conveyer ways for said rollers, carriers journaled on said conveyer chains axially with alternate pivots thereof, guide rollers disposed on said carriers at opposite sides of their pivots to coact with said ways, a carrier discharging and reversing switch way opening into one of the top conveyer ways to receive the forward guide roller of each carrier for discharging and reversing the carriers, a spring detent positioned on the upward reach of said A-shaped portion to temporarily hold the front ends of the carriers while their rear ends are swung forwardly, a slide disposed below the upper reach of the conveyer to receive the load discharged from the carrier, and an upwardly curved guide bar positioned so that the rear ends of the carriers swing over the same as they are reversed.

4. In a structure of the class described, the combination of sprocket wheels, conveyer chains comprising pivoted links provided with rollers at their pivots, top and bottom conveyer ways for said rollers, carriers journaled on said conveyer chains axially with alternate pivots thereof, guide rollers disposed on said carriers at opposite sides of their pivots to coact with said ways, a carrier discharging and reversing switch way opening into one of the top conveyer ways to receive the forward guide roller of each carrier for discharging and reversing the carriers, and a slide disposed below the upper reach of the conveyer to receive the load discharged from the carrier.

5. In a structure of the class described, the combination of a conveyer way and coacting endless conveyer chains, carriers journaled on said conveyer chains, guide rollers disposed on said carriers at opposite sides of their pivots coacting with said way to maintain the carriers in load carrying position, a discharging and reversing switch way opening into the said way to receive the forward guide roller of each carrier, said switch way having an A-shaped portion at its rear end for discharging and reversing the carriers, and a spring detent positioned on the upward reach of said A-shaped portion to temporarily hold the front ends of the carriers while their rear ends are swung forwardly.

6. In a structure of the class described, the combination of a conveyer way and coacting endless conveyer chains, carriers journaled on said conveyer chains, guide rollers disposed on said carriers at opposite sides of their pivots coacting with said way to maintain the carriers in load carrying position, and a discharging and reversing switch way opening into the said way to receive the forward guide roller of each carrier, said switch way having an A-shaped portion at its rear end for discharging and reversing the carriers.

7. In a structure of the class described, the combination of a conveyer way and coacting endless conveyer chains, carriers journaled on said conveyer chains, guide rollers disposed on said carriers at opposite sides of their pivots coacting with said way to maintain the carriers in load carrying position, a discharging and reversing switch way opening into the said way to receive the forward guide roller of each carrier, said switch way having an A-shaped portion at its rear end for discharging and reversing the carriers, and an upwardly curved guide bar positioned so that the rear ends of the carriers swing over the same as they are reversed.

8. In a structure of the class described, the combination of a conveyer way and coacting endless conveyer chains, carriers journaled on said conveyers chains, guide rollers disposed on said carriers at opposite sides of their pivots coacting with said way to maintain the carriers in load carrying position, a discharging and reversing switch way opening into the said way to receive the forward guide roller of each carrier, said switch way having an A-shaped portion at its rear end for discharging and reversing the carriers, and a slide disposed below the upper reach of the conveyer and discharging to the lower reach thereof, the upper ends of said slide being spring supported and positioned to be engaged by the rear ends of the carriers as they are tilted to discharge the load.

9. In a structure of the class described, the combination of a horizontal conveyer way and coacting endless conveyer chain, carriers journaled on said conveyer chain, guide rollers on said carriers coacting with said way to maintain the carriers in load carrying position, a discharging and reversing switch way opening into the said conveyer way to receive the guide roller of each carrier for discharging and reversing the carriers, a slide disposed below the upper reach of the conveyer and discharging to the lower reach thereof, the upper ends of said slide being spring supported and positioned to be engaged by the rear ends of the carriers as they are tilted to discharge the load, and an upwardly curved guide bar positioned so that the rear ends of the carriers swing over the same as they are reversed.

10. In a structure of the class described, the combination of a horizontal conveyer way and coacting endless conveyer chain, carriers journaled on said conveyer chain, guide rollers on said carriers coacting with said way to maintain the carriers in load carrying position, a discharging and reversing switch way opening into the said conveyer way to receive the guide roller of each carrier, and a slide disposed below the upper reach of the conveyer and discharging to the lower reach thereof, the upper ends of said slide being spring supported and positioned to be engaged by the rear ends of the carriers as they are tilted to discharge the load.

11. In a structure of the class described, the combination of a horizontal conveyer way and coacting endless conveyer chain, carriers journaled on said conveyer chain, guide rollers on said carriers coacting with said way to maintain the carriers in load carrying position, a discharging and reversing switch way opening into the said conveyer way to receive the guide roller of each carrier, and an upwardly curved guide bar positioned so that the rear ends of the carriers swing over the same as they are reversed.

In witness whereof, I have hereunto set my hand and seal.

EARLE A. TOWNE. [L. S.]

Witnesses:
GEORGE E. DEAN.
C. THATCHER HATCH, Jr.